US006313983B1

United States Patent
Liu et al.

(10) Patent No.: US 6,313,983 B1
(45) Date of Patent: Nov. 6, 2001

(54) COMPUTER ENCLOSURE

(75) Inventors: Alvin Liu, Pa-Li; Yun-Long Chen, Chung-Ho; Yu-Tai Liu, Hsin-Chuang, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/420,264

(22) Filed: Oct. 18, 1999

(30) Foreign Application Priority Data

Jan. 8, 1999 (TW) ................................................ 88200247

(51) Int. Cl.$^7$ ....................................................... G06F 1/16
(52) U.S. Cl. ........................ 361/683; 361/740; 361/727; 248/551; 312/216
(58) Field of Search ............................ 361/683, 724–727, 361/684–686, 740, 759; 364/708.1; 248/551–553; 312/216, 218; 292/42, 148, 151, 307 R

(56) References Cited

U.S. PATENT DOCUMENTS

| 4,901,202 | * | 2/1990 | Leschinger | 361/683 |
| 5,032,951 | * | 7/1991 | Schropp et al. | 361/725 |
| 6,018,456 | * | 1/2000 | Young et al. | 361/684 |

* cited by examiner

*Primary Examiner*—Leo P. Picard
*Assistant Examiner*—Hung Van Duong
(74) *Attorney, Agent, or Firm*—Wei Te Chung

(57) ABSTRACT

A computer enclosure includes an outer casing receiving an inner casing therein. The inner casing includes a bottom panel and a front panel extending upright from the bottom panel. A disk drive rack is arranged above the bottom panel and attached to the front panel. A main board support panel supporting a main board is attached to the front panel, the bottom and the disk drive rack on a first side of the inner casing. A support member is connected between the disk drive rack and the bottom panel on an opposite second side of the inner casing for enhancing mechanical stability of the structure of the inner casing. The support member has an upper end pivotally attached to the disk drive rack whereby the support member is movable between an open position where the support member is substantially located outside the inner casing for facilitating maintenance and a closed position where an lower end of the support member engages with the bottom panel to releasably secure the support member to the bottom panel. The support member defines three sets of openings for selectively and interchangeably engaging with pawls of three receptacles that contain power supplies of different specifications whereby power supplies of different specifications may be selectively mounted to the computer enclosure.

14 Claims, 5 Drawing Sheets

COMPUTER ENCLOSURE

BACKGROUND OF THE INVENTION

1. Field of the Invention

The present invention generally relates to a computer enclosure, and in particular to a computer enclosure having a power supply support member that is capable to mount power supplies of different specifications to the enclosure.

2. The Prior Art

Personal computers are now in the trend of miniaturization requiring the size thereof to be continuously decreased while electronic devices thereof increasingly added to enhance functions thereof. Thus, space management of a personal computer becomes important, especially when considering assembling/disassembling parts during maintaining the computer.

A power supply is one of the major components of a personal computer. Conventionally, a power supply is directly fixed to a back panel of a computer enclosure by bolts. For allowing easy mounting of the power supply to the computer enclosure, other parts of the computer are not arranged in front of the space accommodating the power supply because if the computer parts are arranged in front of the space accommodating the power supply, the parts have to be removed in order to mount/dismount the power supply which causes inconvenience in maintaining the computer.

U.S. Pat. No. 5,172,305 discloses a swiveling support for mounting the power supply to a computer enclosure. Such a swiveling support allows the power supply to be completely moved outside the computer enclosure by rotating about a rotational axis whereby mounting/dismounting the power supply may be performed without interference caused by the computer enclosure and other parts. However, such a swiveling support is designed for mounting a power supply of a specific size and is not compatible with power supplies of other specifications. This increases costs of parts stocking and inventory.

Furthermore, a computer enclosure comprises a top cover and a bottom panel which are not soundly connected leading to a mechanical instability in resisting bending moment.

It is thus desired to provide a computer enclosure which overcomes the problems discussed above.

SUMMARY OF THE INVENTION

Accordingly, an object of the present invention is to provide a computer enclosure comprising a power supply support member allowing ready mounting/dismounting of the power supply to the computer enclosure.

Another object of the present invention is to provide a computer enclosure comprising a support member for mounting a power supply to the computer enclosure and mechanically reinforcing the enclosure.

A further object of the present invention is to provide a computer enclosure comprising a support member capable of selectively mounting different specifications to the enclosure.

To achieve the above objects, a computer enclosure in accordance with the present invention comprises an outer casing receiving an inner casing therein. The inner casing comprises a bottom panel and a front panel extending upright from the bottom panel. A disk drive rack is arranged above the bottom panel and attached to the front panel. A main board support panel supporting a main board is attached to the front panel, the bottom and the disk drive rack on a first side of the inner casing. A support member is connected between the disk drive rack and the bottom panel on an opposite second side of the inner casing for enhancing mechanical stability of the structure of the inner casing. The support member has an upper end pivotally attached to the disk drive rack whereby the support member is movable between an open position where the support member is substantially located outside the inner casing for facilitating maintenance and a closed position where an lower end of the support member engages with the bottom panel to releasably secure the support member to the bottom panel. The support member defines three sets of openings for selectively and interchangeably engaging with pawls of three receptacles that contain power supplies of different specifications whereby power supplies of different specifications may be selectively mounted to the computer enclosure.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
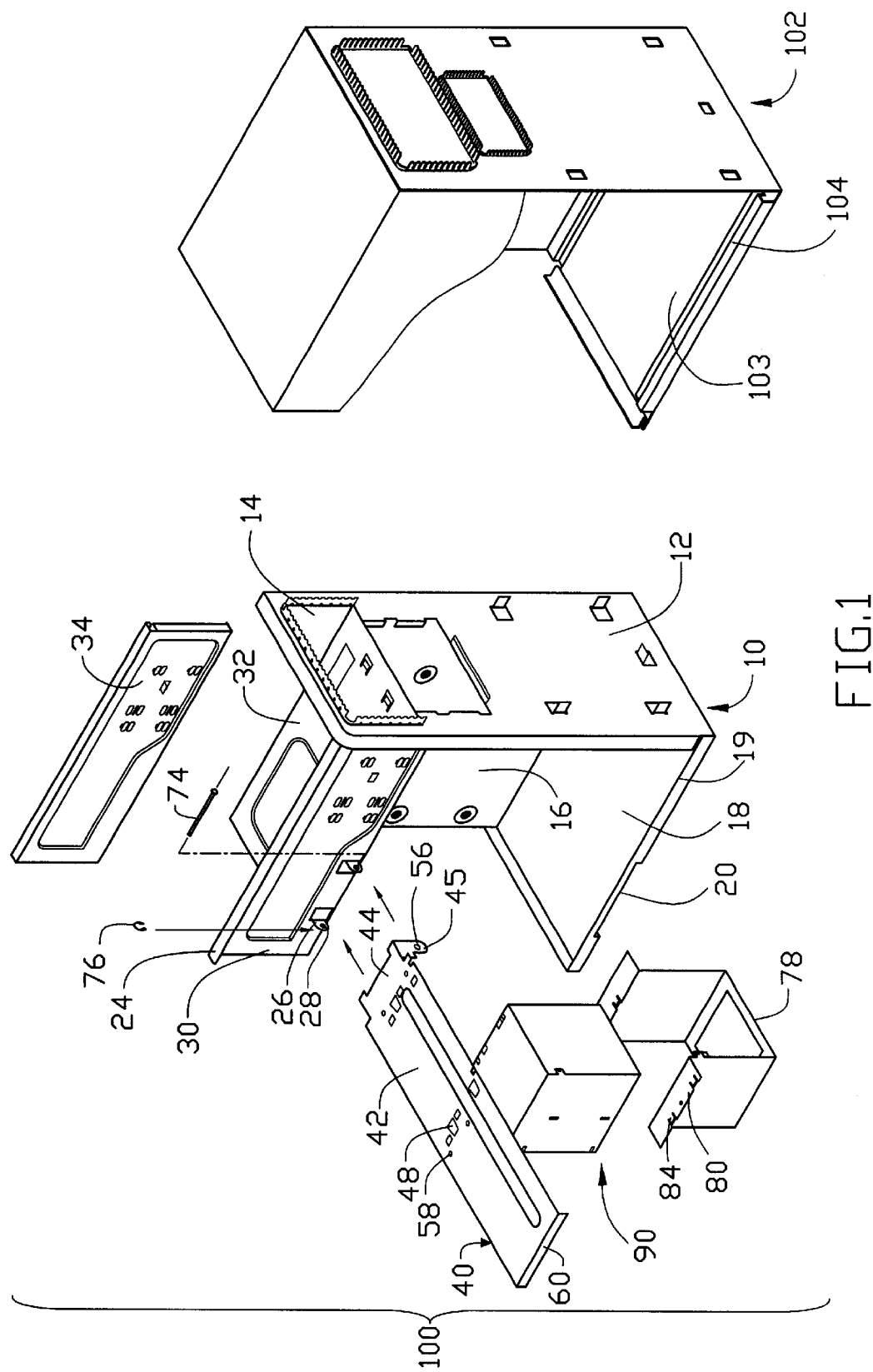
FIG. 1 is an exploded view of a computer enclosure constructed in accordance with the present invention with a power supply support member located at a horizontal open position.
Figure 2:
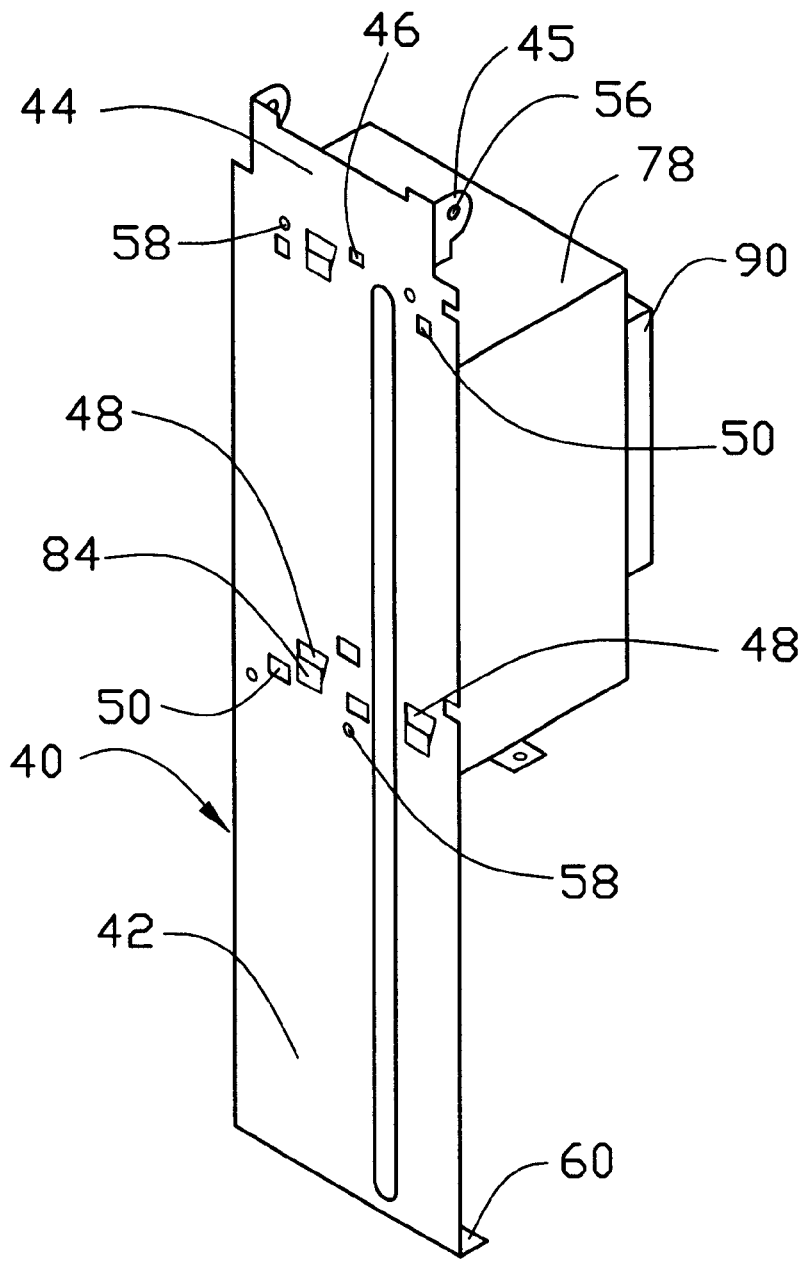
FIG. 2 is a perspective view of the power supply support member at a vertical closed position, a power supply being attached to the support member.

Referring to the drawings and in particular to FIG. 1, a computer enclosure 100 constructed in accordance with the present invention is shown, comprising an outer casing 102 and an inner casing 10. The inner casing 10 is received in the outer casing 102 by being supported on and sliding along rails 104 formed on a bottom plate 103 of the outer casing 102. A power supply 90 is received in the inner casing 102 by being attached to a support member 40 by a receptacle 78 with the support member 40 received and fixed to the inner casing 10 as shown in FIG. 2.

Figure 3:
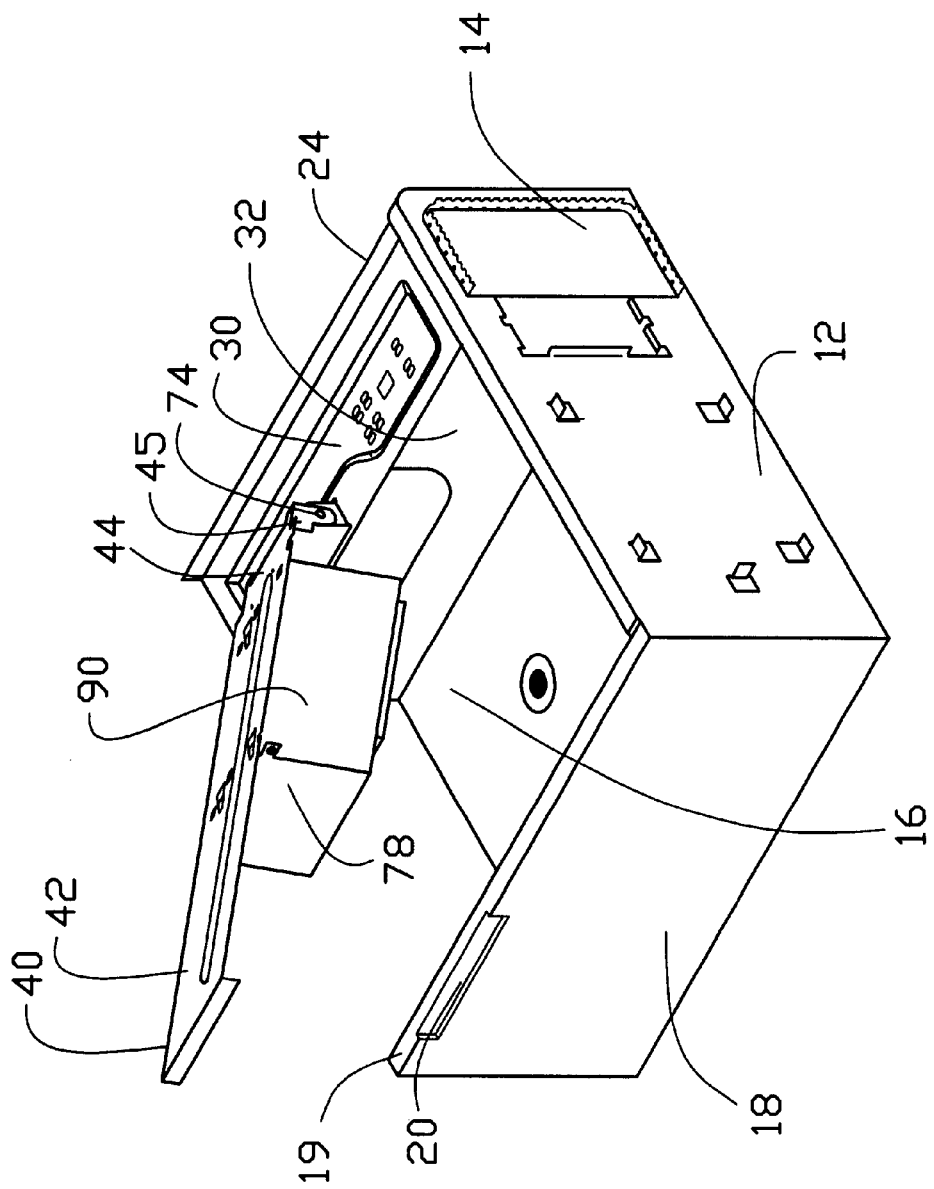
FIG. 3 is a perspective view of an inner casing of the computer enclosure showing the operation of the power supply support member.

Also referring to FIG. 3, the inner casing 10 comprises a bottom panel 18 and a front panel 12 extending upright from a front edge of the bottom panel 18. A main board support panel 16 is arranged on one side of the inner casing 10 and releasably attached to both the bottom panel 18 and the front panel 12. A disk drive rack 24 that is arranged above and substantially parallel to the bottom panel 18 extends from the front panel 12 for receiving and supporting disk drives (not shown). The main board support panel 16 is also attached to the disk drive rack 24. An opening 14 is defined in the front panel 12 substantially aligned with the disk drive rack 24 for receiving the disk drives.

The disk drive rack 24 comprises first and second walls 30, 32 integrally formed with each other whereby the first and second wall 30, 32 are perpendicular to each other with the second wall 32 substantially parallel to the bottom panel 18 of the inner casing 10 and the first wall 30 substantially parallel to the main board support panel 16. A separate third wall 34 is positioned opposite the first wall 30 and attached to the disk drive rack 24 and/or the front panel 12 of the inner casing 10 by suitable means, such as welding or rivets. A space is defined between the first and third walls 30, 34 for accommodating the disk drives. Two opposite and spaced lugs 26 are formed on the first wall 30 with holes 28 defined therein. The holes 28 are aligned with each other for forming a common axis. Preferably, the axis is substantially parallel to the bottom panel 18.

The bottom panel 18 of the inner casing 10 has an upright flange 19 in which an elongate opening 20 is defined opposite the lugs 26 of the disk drive rack 24. Preferably, the elongate opening 20 is formed in the connection between the flange 19 and the bottom panel 18 as shown in the drawings.

Figure 4:
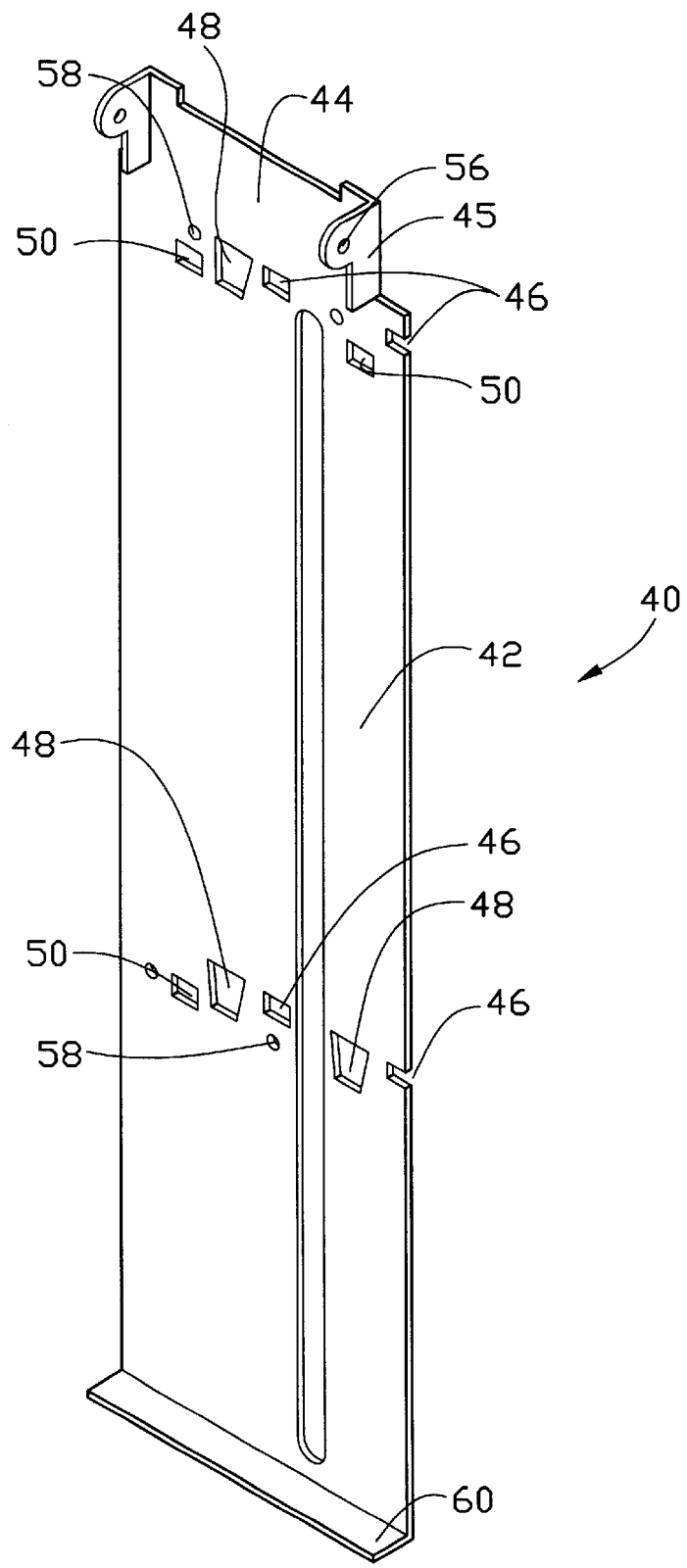
FIG. 4 is a different perspective view of the power supply support member.

Also referring to FIGS. 2 and 4, the support member 40 comprises an elongate plate 42 having upper and lower ends. A perpendicular flange 60 is formed on the lower end of the support member 40. A connection portion 44 is formed on the upper end. Two spaced projections 45 transversely extend from the connection portion 44 corresponding to the lugs 26 of the disk drive rack 24. Aligned holes 46 are defined in the projections 45 for being aligned with the holes 28 of the lugs 26. A pivot shaft 74 extends through the holes 46, 28 of the projections 45 and the lugs 26 and is retained in position by a C-ring 74 for pivotally attaching the support member 40 to the disk drive rack 24 whereby the support member 40 is movable with respect to the inner casing 10 between a closed position where the lower flange 60 is received in and engages with the elongate opening 20 defined in the bottom panel 18 for securing the support member 40 between the disk drive rack 24 and the bottom panel 18 with the power supply 90 completely received in the enclosure 100 and an open position where the support member 40 is moved away from the inner casing 10 with the power supply 90 completely located outside the enclosure 100.

The support member 40 that connects between the first wall 30 of the disk drive rack 24 and the bottom panel 18 of the inner casing 10 is arranged opposite to the main board support panel 16 thereby providing a mechanical reinforcement between the disk drive rack 24 and the bottom panel 18.

Figure 5:
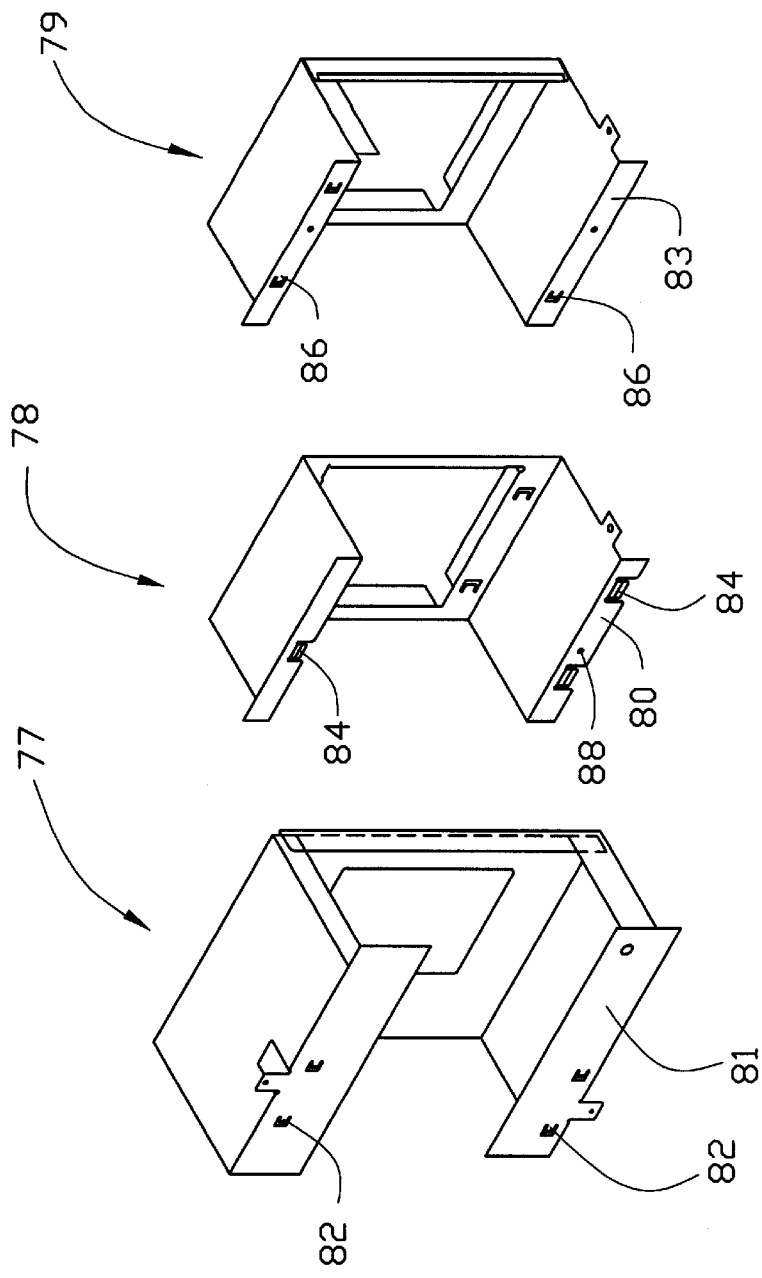
FIG. 5 is a perspective view of the power supply support member of the present invention together with receptacles for accommodating power supplies of different specifications.
Figure 5:
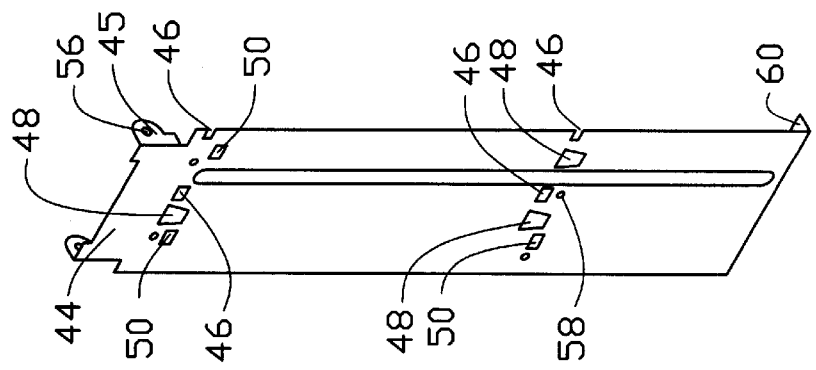

Also referring to FIG. 5, the plate 42 of the support member 40 defines three sets of openings 46, 48, 50 therein respectively corresponding to receptacles 77, 78, 79 for accommodating power supplies of different specifications. The receptacles 77, 78, 79 are interchangeably and selectively engageable with the corresponding openings 46, 48 50 for mounting a power supply of the corresponding specification to the support member 40. By means of the pivotal connection between the support member 40 and the disk drive rack 24, the receptacle 77, 78, 79 and the power supply 90 accommodated therein may be readily moved out of the computer enclosure 100 for replacement or maintenance.

Each receptacle 77, 78, 79 has a U-shape defining an interior space (not labeled) for accommodating the power supply 90 and comprises two transverse flanges 81, 80, 83 for abutting against the plate 42 of the support member 40. Pawls 82, 84, 86 are formed in the flanges 81, 80, 83 of the receptacles 77, 78, 79 for engaging with the corresponding openings 46, 48, 50 defined in the plate 42 of the support member 40 thereby mounting the receptacle 77, 78, 79 and the power supply 90 accommodated therein to the support member 40.

If desired, bolt holes 88 may be defined in the flanges 81, 80, 83 of each receptacle 77, 78, 79 in alignment with holes 58 defined in the plate 42 of the support member 40 for receiving bolts (not shown) to secure the receptacle 77, 78, 79 and the power supply 90 to the support member 40.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A computer enclosure comprising:
   an outer casing; and
   an inner casing received in the outer casing and comprising:
     a bottom panel;
     a disk drive rack arranged above the bottom panel and adapted to receive and accommodate a disk drive;
     a support member having a first end pivotally attached to the disk drive rack and an opposite second end releasably engaging with the bottom panel, the support member being mounted between the disk drive rack and the bottom panel to mechanically reinforce the inner casing; and
     a first receptacle releasably attached to the support member and defining a space adapted to accommodate a first power supply therein.

2. The computer enclosure as claimed in claim 1, wherein two lugs are formed on the disk drive rack defining aligned first holes, projections being formed on the first end of the support member corresponding to the lugs, second holes being defined in the projections in substantial alignment with the first holes for receiving a pivot shaft therethrough thereby pivotally attaching the support member to the disk drive rack.

3. The computer enclosure as claimed in claim 1, wherein a flange is formed on the second end of the support member for being engageable with an opening defined in the bottom panel.

4. The computer enclosure as claimed in claim 1, wherein first openings are defined in the support member for engaging with first pawls of the first receptacle thereby mounting the first receptacle to the support member.

5. The computer enclosure as claimed in claim 1 further comprising at least a second receptacle adapted to accommodate a second power supply having dimensions different from the first power supply, the first and second receptacles being interchangeably and selectively mounted to the support member to mount the corresponding power supply to the support member.

6. The computer enclosure as claimed in claim 1, wherein the outer casing comprises a bottom plate on which sliding rails are formed for slidably supporting the inner casing.

7. The computer enclosure as claimed in claim 1, wherein the inner casing further comprises a panel connected between the disk drive rack and bottom panel, the panel being opposite the support member.

8. The computer enclosure as claimed in claim 4 further comprising bolts for securing the first receptacle to the support member.

9. The computer enclosure as claimed in claim 5, wherein first and second openings are defined in the support member for selectively engaging with first and second pawls of the first and second receptacles.

10. The computer enclosure as claimed in claim 7, wherein the panel supports a main board thereon.

11. A power supply supporting device adapted to mount a power supply to a computer enclosure comprising:
- a flat body defining at least first and second sets of openings adapted to selectively engage with power supplies of first and second specifications;
- connection means formed on a first end of the flat body for pivotally connecting the power supply supporting device to an upper portion of the computer enclosure; and
- securing means formed on an opposite second end of the flat body for releasably securing the power supply supporting device to a lower portion of the computer enclosure.

12. The power supply supporting device as claimed in claim 11 further comprising first and second receptacles adapted to respectively receive the first and second power supplies, the first and second receptacles being selectively and interchangeably attached to the flat body for selectively mounting the first and second power supplies to the flat body, the first and second receptacles respectively forming first and second pawls releasably engageable with the first and second openings of the flat body.

13. The power supply supporting device as claimed in claim 12, wherein the flat body defines first, second and third sets of openings for engaging with first, second and third pawls of first, second and third receptacles that respectively receive first, second and third power supplies of different specifications.

14. A computer assembly comprising:
- an outer casing; and
- an inner casing received within said outer casing and comprising:
  - a disk drive rack positioned in an upper portion of the inner casing;
  - a support member defining an elongated plate with an upper end and a lower end thereof, said upper end pivotally connected to the disk drive rack, said lower end detachably engaged with a bottom panel of the inner casing; and
  - a receptacle releasably attached to the elongated plate of the support member, said receptacle defining a U-shaped configuration which cooperates with the elongated plate to circumferentially restrain a power supply therebetween, thereby said power supply moves in-and-out along with said pivotable support member with regard to both the inner casing and the outer casing.

* * * * *